(12) United States Patent
Tekesky et al.

(10) Patent No.: US 8,245,827 B2
(45) Date of Patent: *Aug. 21, 2012

(54) CLUTCH BRAKE ASSEMBLY

(75) Inventors: Robert Steve Tekesky, North Olmsted, OH (US); James M. Latsko, Parma, OH (US); Gerald Matthew Szpak, North Royalton, OH (US)

(73) Assignee: Eaton Corporation, Cleveland, OH (US)

( * ) Notice: Subject to any disclaimer, the term of this patent is extended or adjusted under 35 U.S.C. 154(b) by 925 days.

This patent is subject to a terminal disclaimer.

(21) Appl. No.: 12/218,781

(22) Filed: Jul. 18, 2008

(65) Prior Publication Data
US 2008/0308381 A1 Dec. 18, 2008

Related U.S. Application Data (63) Continuation-in-part of application No. 11/590,199, filed on Oct. 31, 2006, now Pat. No. 7,604,104.

(51) Int. Cl.
*F16D 67/04* (2006.01)
(52) U.S. Cl. ............... 192/18 A; 192/85.41; 192/85.61; 192/113.22
(58) Field of Classification Search ............ 192/113.2, 192/113.22, 113.26
See application file for complete search history.

(56) References Cited

U.S. PATENT DOCUMENTS

| | | | | | |
|---|---|---|---|---|---|
| 2,097,710 | A | * | 11/1937 | Whitelaw et al. | 192/107 R |
| 2,348,025 | A | * | 5/1944 | Peets et al. | 192/113.22 |
| 3,489,255 | A | * | 1/1970 | Gatewood | 192/89.26 |
| 3,727,731 | A | * | 4/1973 | Selig | 192/18 A |
| 5,873,444 | A | * | 2/1999 | Kozhevnikov et al. | 192/18 A |
| 6,637,568 | B2 | | 10/2003 | Latsko | |
| 7,374,027 | B2 | | 5/2008 | Mayberry et al. | |
| 7,556,128 | B2 | | 7/2009 | Mayberry et al. | |
| 7,591,349 | B2 | | 9/2009 | McConkie et al. | |
| 7,604,104 | B2 | * | 10/2009 | Tekesky | 192/18 A |
| 2008/0110708 | A1 | | 5/2008 | Mayberry et al. | |
| 2008/0185239 | A1 | | 8/2008 | Hakon et al. | |
| 2009/0133974 | A1 | | 5/2009 | Mayberry et al. | |

FOREIGN PATENT DOCUMENTS
EP 1918607 A1 10/2007

OTHER PUBLICATIONS
European Search Report.

* cited by examiner

*Primary Examiner* — Rodney Bonck
(74) *Attorney, Agent, or Firm* — Daniel S Kalka (57) ABSTRACT

A clutch-brake assembly transmits force to rotate a shaft and to retain the shaft against rotation. The assembly includes a plurality of force transmitting members which transmit force between a piston and a base member. A plurality of springs urge the piston to move relative to the base member. A plurality of spring retainers are disposed between the base member and the piston. Each of the spring retainers includes a plurality of projecting portions extending from the base portion. Each of the springs is telescopically disposed on one of the projecting portions. Each of the force transmitting members is disposed between adjacent spring retainers.

11 Claims, 8 Drawing Sheets

CLUTCH BRAKE ASSEMBLY

This application is a continuation-in-part of U.S. patent application Ser. No. 11/590,199 filed Oct. 31, 2006 now U.S. Pat. No. 7,604,104.

BACKGROUND OF THE INVENTION

The present invention relates to an improved clutch-brake assembly which is utilized to transmit force to rotate a shaft and to transmit force to retain the shaft against rotation.

Known clutch-brake assemblies have previously been connected with a shaft to control power transmission. These known clutch-brake assemblies have been utilized in association with can-making machines, press drives, and shear drives, as well as other machines. Known clutch-brake assemblies are disclosed in U.S. Pat. Nos. 5,046,593; 5,257,684; 5,577,581; and 6,637,568.

When machines have different operating characteristics, the force transmitting capability of a clutch-brake assembly must correspond to the operating characteristics of the machine with which the clutch-brake assembly is utilized. Thus, a first machine may require the transmission of relatively large forces to rotate a shaft and to retain the shaft against rotation. Another machine may require smaller forces to rotate the shaft and retain the shaft against rotation.

It has been observed with another manufacturer's clutch brake assembly that as the friction material wears down completely the brake in that assembly will not function to stop the press which can result in serious injury to the operator. In contrast, the clutch-brake assembly of the instant invention will function in the braking mode even when all of the friction material is completely worn down.

Unlike those clutch-brake assemblies, the clutch-brake assembly of the present invention provides additional safety features as will be further described herein.

SUMMARY OF THE INVENTION

The present invention relates to an improved clutch-brake assembly which is readily adjusted to accommodate force and torque requirements of different machines. The clutch-brake assembly may include a base member having a central opening which receives a shaft. A clutch surface may be movable relative to the base member. A brake surface may be movable relative to the base member. A piston may be movable in a first direction relative to the base member to press a first friction surface against the clutch surface to enable force to be transmitted from the clutch surface. The piston may be movable in a second direction to press a second friction surface against the brake surface.

A plurality of springs may urge the piston in one of the first second directions relative to the base member. A plurality of spaced apart spring retainers have projecting portions on which the springs are telescopically disposed. Force transmitting members are disposed between adjacent spring retainers of the plurality of spring retainers.

BRIEF DESCRIPTION OF THE DRAWINGS

The foregoing and other features of the invention will become more apparent upon a consideration of the following description taken in connection with the accompanying drawings wherein.

DESCRIPTION OF A SPECIFIC PREFERRED EMBODIMENT OF THE INVENTION

General Description

A clutch-brake assembly 20 (FIGS. 1, 2A and 2B) is operable between an engaged condition and a disengaged condition. When the clutch-brake assembly 20 is in the engaged condition, the clutch-brake assembly is effective to transmit force from a drive member 22 (FIG. 1) to a driven member 24. When the clutch-brake assembly 20 is in the disengaged condition, the clutch-brake assembly is effective to hold the driven member 24 against rotation.

The illustrated drive member 22 (FIG. 1) is a circular flywheel which is driven by belts 26 which extend around the periphery of the flywheel. The drive member 22 is connected with the clutch-brake assembly 20 by connector members 27. The illustrated driven member 24 is a metal shaft which is rotated about its longitudinal central axis under the influence of force transmitted from the flywheel 22 through the clutch-brake assembly 20 to the shaft.

The shaft 24 and flywheel 22 may be mounted on bearings 28 (FIG. 1) for rotation relative to each other in a manner generally similar to that disclosed in U.S. Pat. No. 5,577,581. However, the flywheel 22 and shaft 24 may be mounted in a different manner if desired. It should be understood that the flywheel 22 and shaft 24 are representative of many different known drive and driven members.

When the clutch-brake assembly 20 is in the disengaged condition, the clutch-brake assembly transmits force from a stationary member or frame 30 to hold the shaft 24 against rotation. The stationary frame 30 may be any desired structure which is stationary. The stationary frame 30 is connected with the clutch-brake assembly 20 by connector members 32. The disengaged the clutch-brake assembly 20 interconnects the stationary frame 30 and the shaft 24 so that the shaft does not rotate.

The clutch-brake assembly 20 is operated to the engaged condition by fluid pressure, that is, air. The fluid pressure is conducted from a source or conduit 34, through a solenoid operated valve 36 to a central passage 38 in the shaft 24. The clutch-brake assembly 20 is connected in fluid communication with the central passage 30 in the shaft 24.

Figure 1:
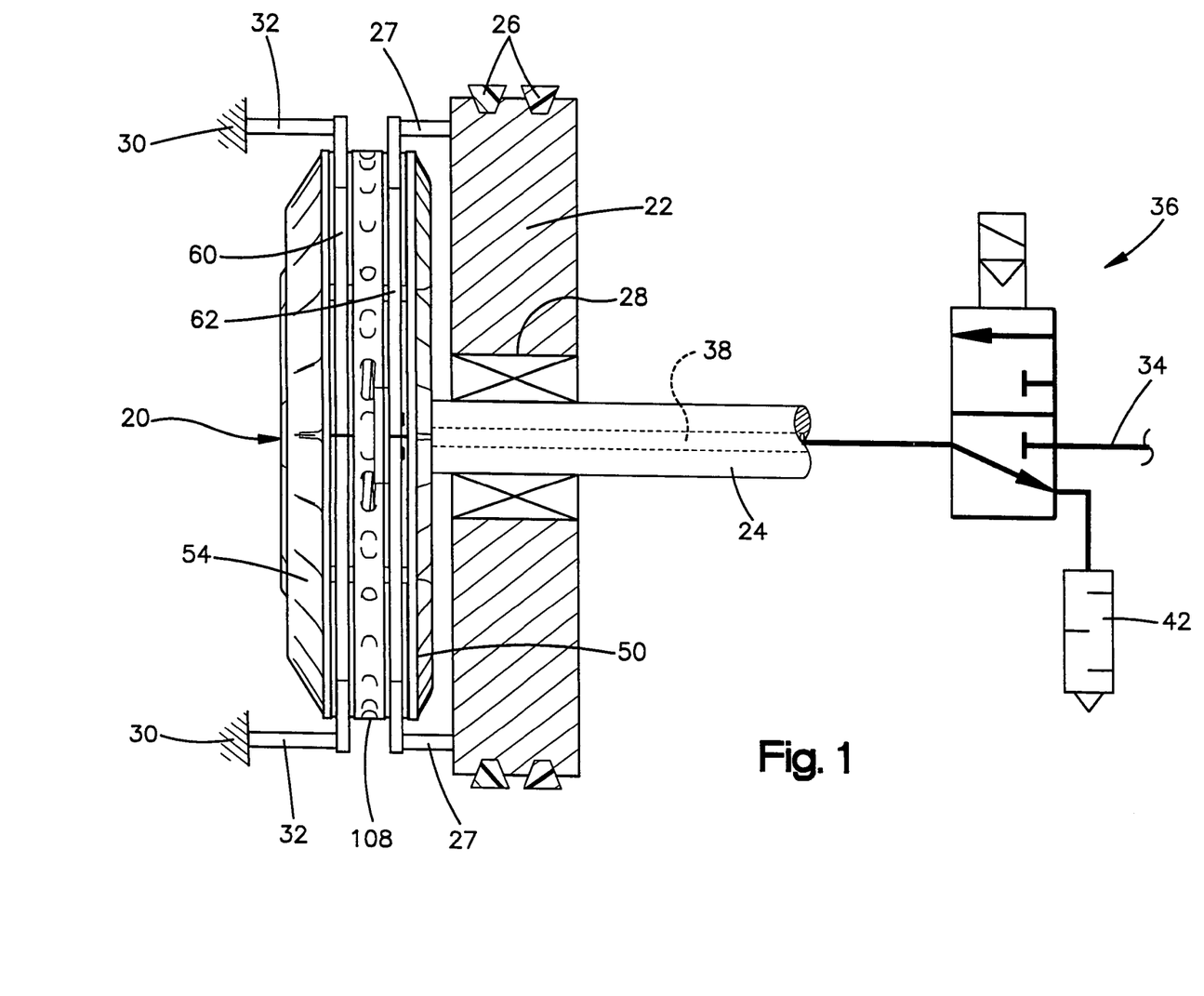
FIG. 1 is a simplified schematic illustration depicting the manner in which a clutch-brake assembly constructed in accordance with the present invention may be mounted to transmit force to rotate a shaft and to transmit force to retain the shaft against rotation.

When the valve 36 is in the unactuated condition illustrated schematically in FIG. 1, the passage 38 in the shaft 24 and the clutch-brake assembly 20 are exhausted to atmosphere through a muffler 42. At this time, the disengaged clutch-brake assembly 20 connects the shaft 24 with the stationary frame 30 to hold the shaft against rotation.

Upon actuation of the valve 36, the source conduit 34 is connected in fluid communication with the passage 38. Fluid pressure conducted through the shaft 38 to the clutch-brake assembly 20 actuates the clutch-brake assembly to the engaged condition. When the clutch-brake assembly 20 is in the engaged condition, force is transmitted from the flywheel 22 through the clutch-brake assembly 20 to the shaft 24 to rotate the shaft about its longitudinal central axis. It is contemplated that the shaft 24 may be connected with many different types of equipment. For example, the clutch-brake assembly 20 may be utilized to transmit power to a can-forming machine.

Although the clutch-brake assembly 20 may be associated with can-forming machines, it is contemplated that the clutch-brake assembly will be utilized in association with other known machines requiring acceleration and deceleration of components of the machine and relatively high disengaging and engaging frequencies. The machines with which the clutch-brake assembly 20 is associated may, for example, be a press and/or shear drive. The machines may be single stroke or continuous-running machines. For example, the clutch-brake assembly 20 may be associated with metal stamping machines, wire processing machines, thread rolling machines, veneer-cutting machines, bottle sorting machines, paper processing machines or textile machines. Of course, it should be understood that the clutch-brake assembly 20 may be associated with other known types of machines if desired.

The clutch-brake assembly 20 has the same general construction as the clutch-brake assembly disclosed in U.S. Pat. No. 6,637,568. The disclosure in the aforementioned U.S. Pat. No. 6,637,568 is hereby incorporated herein in its entirety by this reference thereto.

Figure 2A:
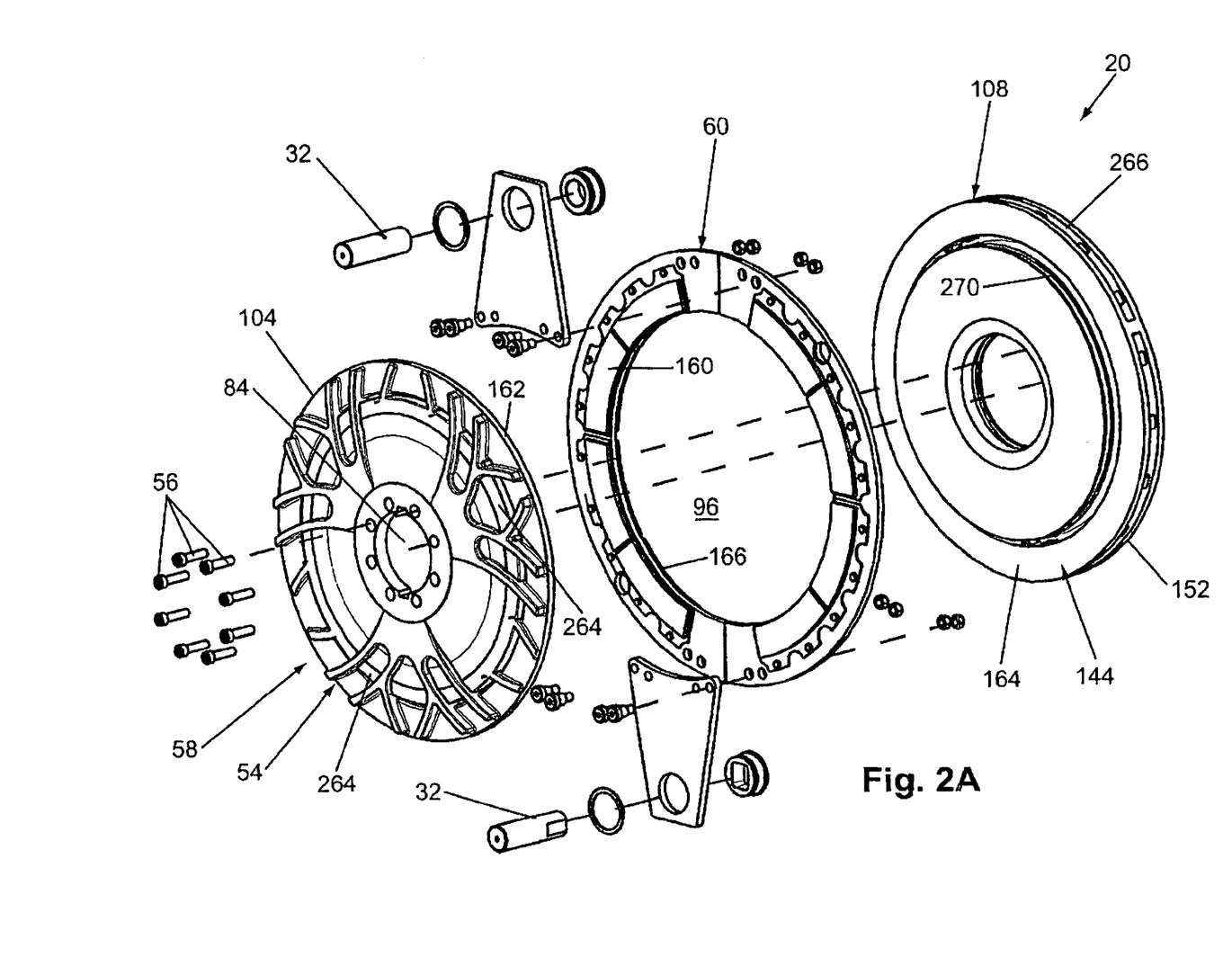
FIGS. 2A and 2B are an exploded schematic pictorial illustration depicting the construction of the clutch-brake assembly of FIG. 1.
Figure 2B:
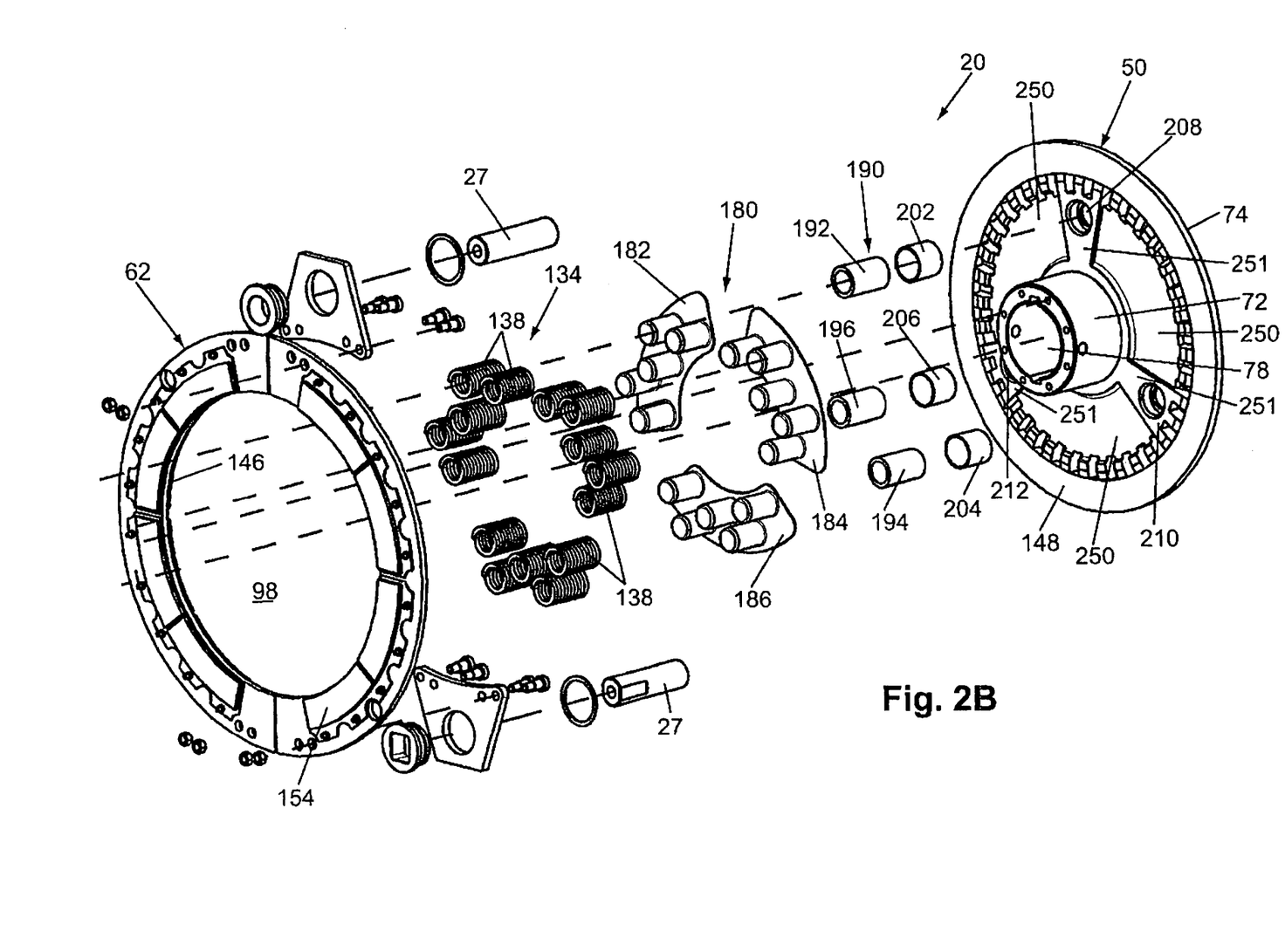

The clutch-brake assembly 20 (FIG. 2) includes a hub or base end member 50 (FIGS. 1 and 2B) and a cylinder or cover member 54 (FIGS. 1 and 2A. The cylinder or cover member 54 and hub or base end member 50 are interconnected by bolts 56 (FIG. 2A) to form a body assembly 58. In addition, the clutch-brake assembly 20 includes a brake disc 60 and a clutch disc 62 (FIG. 2B). The brake disc 60 (FIG. 2A) is connected with the body assembly 58. The brake disc 60 is freely rotatable relative to body assembly 58 when the clutch-brake assembly 20 is in the engaged condition. The clutch disc 62 (FIG. 2B) is also connected with the body assembly 58. The clutch disc 62 is freely rotatable relative to the body assembly 58 when the clutch-brake assembly 20 is in the disengaged condition.

In addition, the brake and clutch discs 60 and 62 (FIGS. 2A and 2B) are axially moveable, through a limited range of movement, relative to the body assembly 58. The brake and clutch disc 60 and 62 have a generally annular configuration. The body assembly 58 extends through circular openings in the central portions of the brake disc 60 and clutch disc 62. Regardless of the orientation in which the clutch-brake assembly 20 is disposed, the brake disc 60 is connected with the stationary frame member 30 by the connector members 32 and the clutch disc 62 is connected with the driving member or flywheel 22 by the connector members 27. The body assembly 58 of the clutch-brake assembly 20 is fixedly connected to the shaft or other driven member 24.

When the clutch-brake assembly 20 is in the engaged condition, the clutch-disc 62 is held against rotation relative to the body assembly 58. At this time, the clutch-disc 62 is effective to transmit force from the flywheel 22 to the body assembly 58. This force rotates the body assembly and the shaft 24 about the longitudinal central axis of the shaft. At this time, the body assembly 58 is freely rotatable relative to the brake disc 60.

When the clutch-brake assembly 20 is in the disengaged condition, the body assembly 58 is held against rotation relative to the brake disc 60. This enables force to be transmitted from the stationary frame 30 through the brake disc 60 to the body assembly 58 to hold the body assembly and shaft 24 against rotation. At this time, the flywheel 22 (FIG. 1) and clutch disc 62 (FIG. 2B) are freely rotatable together relative to the body assembly 58 and shaft 24.

The metal body assembly 58 of the clutch-brake assembly 20 includes the metal hub or base member 50. The hub or base member 50 is cast as one piece of metal and includes a generally cylindrical central section 72 (FIG. 2B). A generally annular flange section 74 is integrally formed as one piece with the central section 72 and extends radially outward from the central section. A cylindrical central opening or passage 78 extends through the central section 72 of the hub or base member 50.

The body assembly 58 also includes the circular metal cylinder or cover member 54 (FIG. 2A) which is fixedly connected to the hub or base member 50 (FIG. 2B) by the bolts 56. The cylinder or cover member 54 has a circular opening 84 which is disposed in a coaxial relationship with and forms a continuation of the central opening 78 in the hub or base member 50.

The annular brake disc 60 (FIG. 2A) and annular clutch disc 62 (FIG. 2B) are disposed in a coaxial relationship with the circular hub or base member 50 and the circular cylinder or cover member 54. The brake disc 60 has a circular central opening 96 which is disposed in a coaxial relationship with the circular central opening 78 in the hub or base member 50. Similarly, the clutch disc 62 has a circular central opening 98 which is disposed in a coaxial relationship with the central opening 78 in the hub or base member 50. The central openings 96 and 98 in the brake disc 60 and clutch disc 62 are the same size and are smaller in diameter than the flange section 74 of the hub or base member 50 and circular rim portion 104 of the cylinder or cover member 54. Therefore, the brake disc 60 and clutch disc 62 are connected with the body assembly 58 by being retained between the flange section 74 of the hub or base member 70 and the rim portion 104 of the cylinder or cover member 54.

An annular piston 108 (FIG. 2A) is disposed between the hub or base member 50 and the cylinder or cover member 54. The piston 108 cooperates with the hub or base member 50 and cylinder or cover member 54 to form an annular variable volume fluid chamber 110 and annular variable spring chamber. The annular variable fluid chamber 110 is connected in fluid communication with the central opening 78 in the hub or base member 50 and with the shaft 24 by a passage which extends through the central section 72 of the hub or base member 50. The variable volume spring chamber is continuously connected in fluid communication with atmosphere around the clutch-brake assembly through openings formed in the hub or base end member 50.

The piston 108 is continuously urged toward the cylinder or cover member 82 by a plurality 134 (FIG. 2B) of springs 138. The plurality 134 of springs 138 is disposed in an annular array about and in a coaxial relationship with the cylindrical central portion 72 of the hub or base member 50. The left (as viewed in FIG. 2B) ends of the helical coil springs 138 are disposed in the spring chamber in the piston 108 and are disposed in engagement with the piston.

During operation of the clutch-brake assembly 20, fluid, that is, air, under pressure is conducted through the valve 36 (FIG. 1) and through the passage 38 in the shaft 24. The fluid pressure is conducted through an outlet in a cylindrical outer side surface of the shaft 24 through a passage in the hub or base member 50. The fluid pressure is conducted into an annular variable volume fluid chamber 110 formed between the piston 108 and the cylinder or cover member 54.

The fluid pressure in the fluid chamber 110 formed between the piston 108 and the cover member 54 is effective to apply force against the piston 108 and to compress the plurality 134 of springs 138. As this occurs, an annular flange portion 144 of the piston 108 presses an annular friction surface 146 on the clutch disc 62 firmly against an annular friction surface 148 on the flange section 74 of the hub or base member 50. At the same time, an annular friction surface 152 on the flange section 144 of the piston 108 presses against a second friction surface 154 on the clutch disc 62.

This results in force, that is, torque being transmitted from the flywheel 22 (FIG. 1) through the clutch disc 62 (FIG. 2) to the hub or base member 50. The hub or base member 50 is connected with the shaft 24. Torque transmitted from the flywheel 22 through the clutch disc 62 and hub or base member 50 to the shaft 24 is effective to rotate the shaft about its longitudinal central axis.

When the clutch-brake assembly 20 is to be disengaged, the variable volume fluid chamber 110 between the piston 108 and the cylinder or cover member 54 is vented to atmosphere through a passage in the hub or base member, the passage 38 in the shaft 24 (FIG. 1), and the valve 36. This results in the plurality 134 (FIG. 2) of springs 138 being effective to press the annular flange portion 144 of the piston 108 against the annular brake disc 60. The annular friction surface 160 on the brake disc 60 is pressed against an annular friction surface 162 on the rim portion 104 of the cylinder or cover member 58. At the same time an annular friction surface 164 on the flange section 144 of the piston 108 is pressed against a friction surface 166 on the brake disc 60. This results in force being transmitted between the stationary frame or member 30 (FIG. 1) and the shaft 24 through the brake disc 60 and hub or base member 50. The force transmitted through the brake disc 60 is effective to hold the shaft 24 against rotation.

The general construction and made of operation of the clutch-brake assembly 20 is similar to the construction and mode of operation of clutch-brake assemblies disclosed in the aforementioned U.S. Pat. Nos. 5,046,593; 5,257,684; and 6,637,568. The disclosure in the aforementioned U.S. Pat. No. 6,637,568 has been and hereby is incorporated herein.

Spring Retainers

In accordance with one of the features of the present invention, a plurality 180 of identical spring retainers 182, 184, and 186 (FIG. 2B) are disposed in a circular array between the hub or base member 50 and the piston 108. The helical coil springs 138 in the plurality 134 of springs are positioned relative to the hub or base member 50 and the piston 108 by the plurality 180 of identical spring retainers 182-186.

A plurality 190 (FIG. 2B) of force transmitting members 192, 194, and 196 extend between the hub or base member 50 and the piston 108. The hollow cylindrical force transmitting members or tubes 192-196 are slidably received in hollow cylindrical bushings 202, 204, and 206. The bushings 202, 204, and 206 are fixedly secured in cylindrical openings (not shown) in the piston 108. The right (as viewed in FIG. 2) end portions of the force transmitting members 192, 194 and 196 are secured in cylindrical openings in the hub or base member 50. The opposite or left (as viewed in FIG. 2) ends of the force transmitting members 192, 194 and 196 are slidably received in the bushings 202, 204 and 206.

The force transmitting members 192-196 interconnect the hub or base member 50 and the piston 108. When the clutch-brake assembly 20 is in the engaged condition, force (torque) is transmitted from the flywheel 22 to the clutch disc 62. Force is transmitted from the clutch disc 62 to both the piston 108 and the hub or base member 50. Force is transmitted between the hub or base member 50 and the piston 108 by the force transmitting members 192-196. Therefore, the hub 50 and piston 108 are rotatable together.

The force transmitting members 192, 194 and 196 (FIG. 2B) are disposed between and are spaced from adjacent spring retainers 182-186. Thus, the force transmitting member 192 is disposed between the spring retainers 182 and 184. Similarly, the force transmitting member 194 is disposed between the spring retainers 184 and 186. The force transmitting member 196 extends between the spring retainers 186 and 182. The force transmitting members 192-196 are axially slidable relative to the bushings 202-206 and the piston 108 to accommodate axial movement between the piston and hub or base member 50.

The spring retainer 182 (FIG. 3) is integrally formed as one piece of molded polymeric material. The spring retainer 182 includes a base 220 and a plurality of identical hollow projections 224. Although the projections 224 are hollow, they could be solid if desired.

Figure 3:
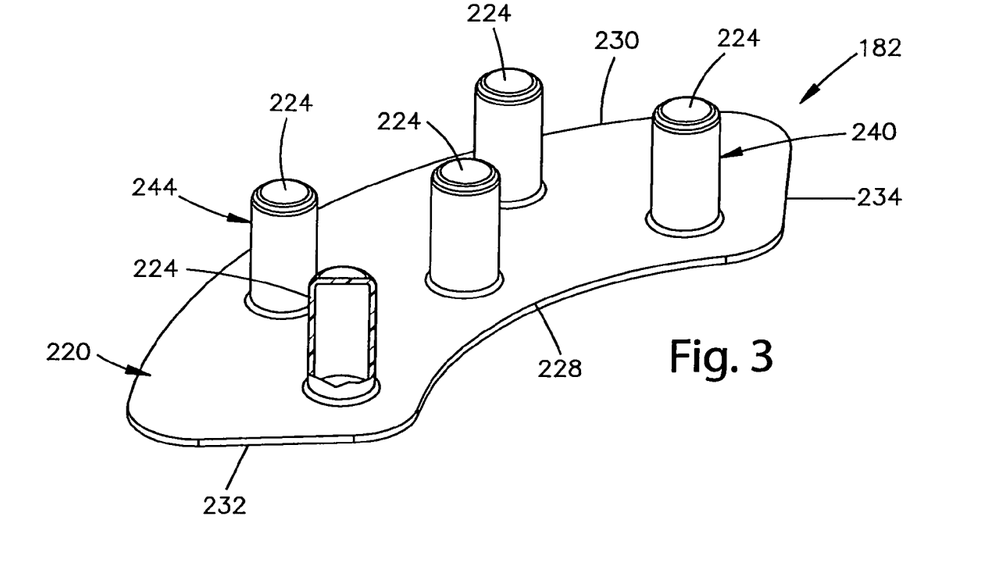
FIG. 3 is an enlarged fragmentary pictorial illustration of a spring retainer utilized in the clutch-brake assembly of FIGS. 1 and 2.

The base 220 of the spring retainer 182 is formed as a flat plate and has an arcuate, radially inner edge portion 228 and an arcuate, radially outer edge portion 230. Side edge portions 232 and 234 extend radially between the arcuate inner and outer edge portions 228 and 230. The side edge portions 232 and 234 are disposed along radial axes which extend through the center of curvature of the radially inner and radially outer edge portions 228 and 230. The spring retainers 184 and 186 have the same construction as the spring retainer 182.

The projections 224 include an arcuate radially inner series 240 of projections which are disposed in an arcuate array and an arcuate radially outer series 244 of projections which are disposed in an arcuate array. The radially inner and outer series 240 and 244 of projections are disposed in arcuate arrays which have centers of curvature which are disposed on the longitudinal central axis of the clutch-brake assembly 20. The radially inner and outer edge portions 232 and 234 have a common center of curvature which is coincident with the center of curvature of the arcuate series 240 and 244 of projections.

Although the radially inner series 240 of projections have been shown as having more projections than the radially outer series 244 of projections, it is contemplated that more projections may be provided in a radially outer series 244 of projections than in the radially inner series 240 of projections. The projections 244 have parallel central axes which extend perpendicular to the base 220.

The spring retainers 182, 184 and 186 are disposed in recesses 250 (FIG. 4) formed between radially extending ribs 251 (FIG. 2B) on the hub or base member 50. Each of the recesses 250 has an arcuate configuration which is similar to and slightly larger than the configuration of the base 220 of the spring retainer 182 (FIG. 3). Once the identical spring retainers 182, 184 and 186 have been positioned in the identical recesses 250 in the base 50, in the manner illustrated in FIG. 4, the coil springs 138 are telescopically positioned on the projections 224.

Figure 4:
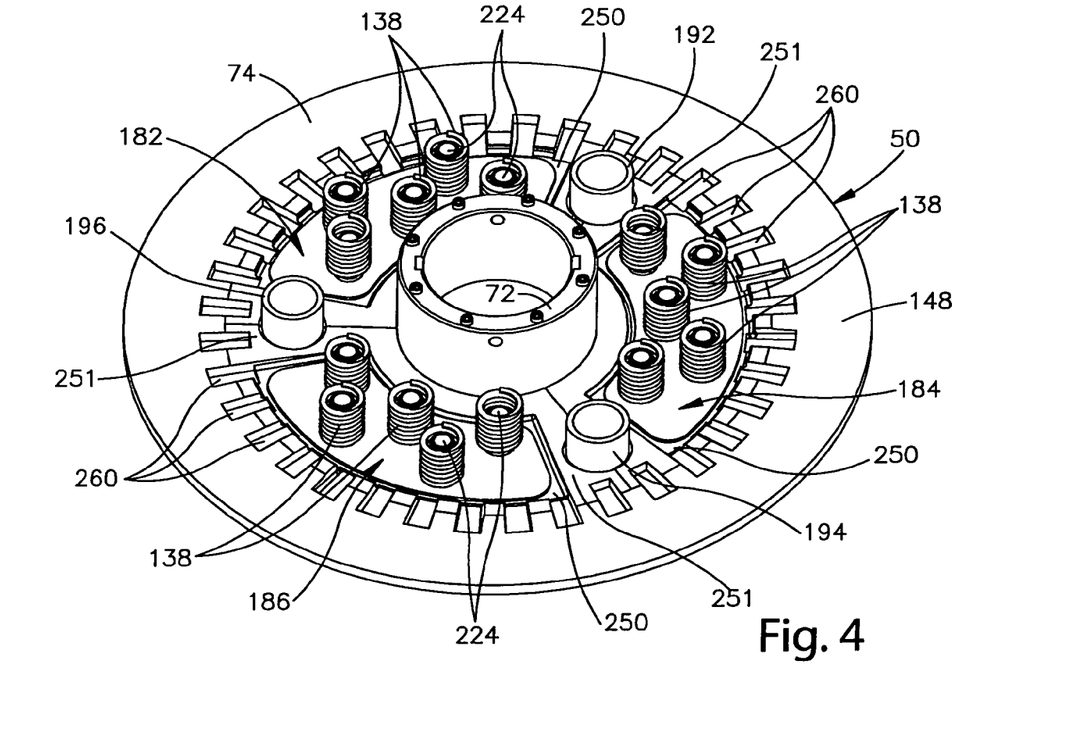
FIG. 4 is a schematic plan view depicting the manner in which springs are telescopically disposed on projections of the spring retainer of FIG. 3 and the manner in which force transmitting members are disposed between adjacent spring retainers.

The lower (as viewed in FIG. 4) ends of the springs 138 engage the base 220 of one of the spring retainers 182, 184 or 186. The upper ends of the springs 138 extend past the upper ends (as viewed in FIG. 4) of the projections 224. The springs 138 are disposed in a coaxial relationship with the projections 224 when the springs are telescopically disposed on the projections, as shown in FIG. 4.

The projections 224 hold the springs 138 in an orientation in which they extend perpendicular to the flat bottom side surface of the recess 250 in the hub or base member 50 and perpendicular to the piston 108. The springs 138 are positioned relative to both the hub or base member 50 and the piston 108 by the spring retainers 182, 184 and 186. The piston 108 is formed with recesses, having a configuration similar to the configuration of the recess 250 in the hub or base member 50, to receive the ends of the springs 138 which are spaced from the base 220. The ends of the projections 224 do not engage the piston 108.

The spring retainers 182, 184 and 186 are received in recesses 250 formed in the hub or base member 50. The springs 138 on the projections 224 of the radially inner series 240 of projections on the spring retainers 182, 184 and 186 are disposed in a circular array having its center disposed on the longitudinal central axis of the clutch-brake assembly 20. Similarly, the springs 138 disposed on the projections 224 in the radially outer series 244 of projections on the spring retainers 182, 184 and 186 are disposed in a circular array having its center on the longitudinal central axis of the clutch-brake assembly 20. The force transmitting members 192-196 are disposed in a circular array having a radius of curvature which is greater than the radius of curvature of the radially inner series 240 of spring retainers.

The springs 138 may be telescopically positioned on the projections 224 either before or after the spring retainers 182, 184 and 186 are positioned in the recesses 250 in the hub or base member 50. Thus, the springs 138 may be positioned on the projections 224 on the spring retainers 182, 184 and 186 while the spring retainers are spaced from the hub or base 50. The spring retainers 182, 184 and 186, with the springs on the projections 224, may then be positioned in the recesses 250 in the hub or base member 50.

When a clutch-brake assembly 20 is to be assembled for use in association with a driven member 24 connected with a particular machine having specific force or torque requirements, the springs 138 may be selected to have a stiffness which will provide the requisite force or torque when the clutch-brake assembly is in the engaged condition. Thus, springs 138 having coils formed by relatively thick turns of wire may be utilized when the clutch-brake assembly 20 is to have relatively large force or torque transmitting capability. Alternatively, when the clutch-brake assembly 20 is to have relatively small force or torque transmitting capability, springs 138 formed from relatively thin wire may be utilized. Regardless of the size of the wire from which the springs 138 are formed, the helical coil springs will be formed with central openings which allow them to be telescopically positioned on the projections 224. Therefore, the spring constants of the springs 138 and the force which is transmitted by the clutch-brake assembly 20 can be adjusted to enable the clutch-brake assembly to be used in association with drive shafts 24 for machines having different force or torque requirements.

Figure 5:
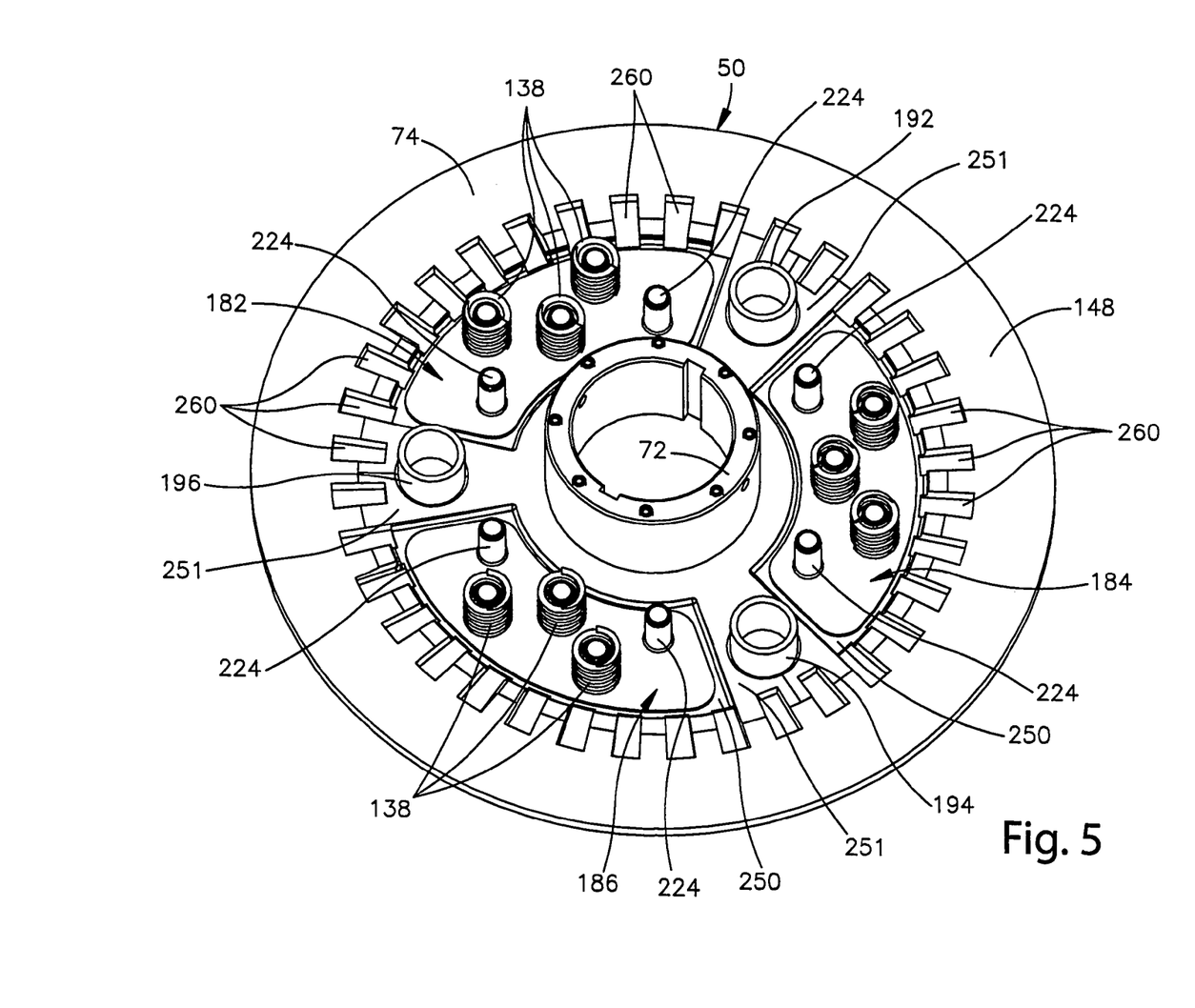
FIG. 5 is a schematic plan view, generally similar to FIG. 4, depicting the manner in which springs are disposed on only some of the projections of the spring retainer and other projections are free of springs.

Rather than providing springs 138 having spring constants which enable the requisite force or torque to be transmitted when the clutch-brake assembly 20 is in the engaged condition, the number of springs may be varied. In FIG. 4, a spring 138 is provided in association with each of the projections 224. However, by eliminating the springs in associated with some of the projections, the force or torque transmitting characteristics of the clutch-brake assembly 20 may be reduced. Thus, the springs may be omitted from two of the projections 224 on each of the spring retainers 182-186 in the manner illustrated in FIG. 5. Of course, a greater or lesser number of springs may be omitted if desired. By reducing the number of springs in association with each of the spring retainers 182-186, the force or torque transmitting capability of the engaged clutch-brake assembly 20 can be reduced without changing the construction of the individual springs 138.

In order to promote cooling of the clutch-brake assembly 20, openings 260 (FIG. 4) are formed in the base 50. The openings 260 enable air to flow through the base 50 into the central opening 98 (FIG. 2) in the clutch disc 62. Similarly, slots or openings 264 (FIG. 2) are formed in the cylinder or cover member 54. The openings 264 in the cylinder or cover member 54 enable air to flow through the cover into the opening 96 in the brake disc 60. The opening 96 in the brake disc 60 and the opening 96 in the clutch disc 62 are connected in fluid communication with openings 266 in the piston 108. The radially extending openings 266 in the periphery of the piston 108 are connected in fluid communication with slots or openings 270 in opposite major sides of the piston 108 by internal passages within the piston. This enables a cooling airflow to be established between the cylinder or cover member 54 and the hub or base member 50 through the piston 108.

Figure 6:
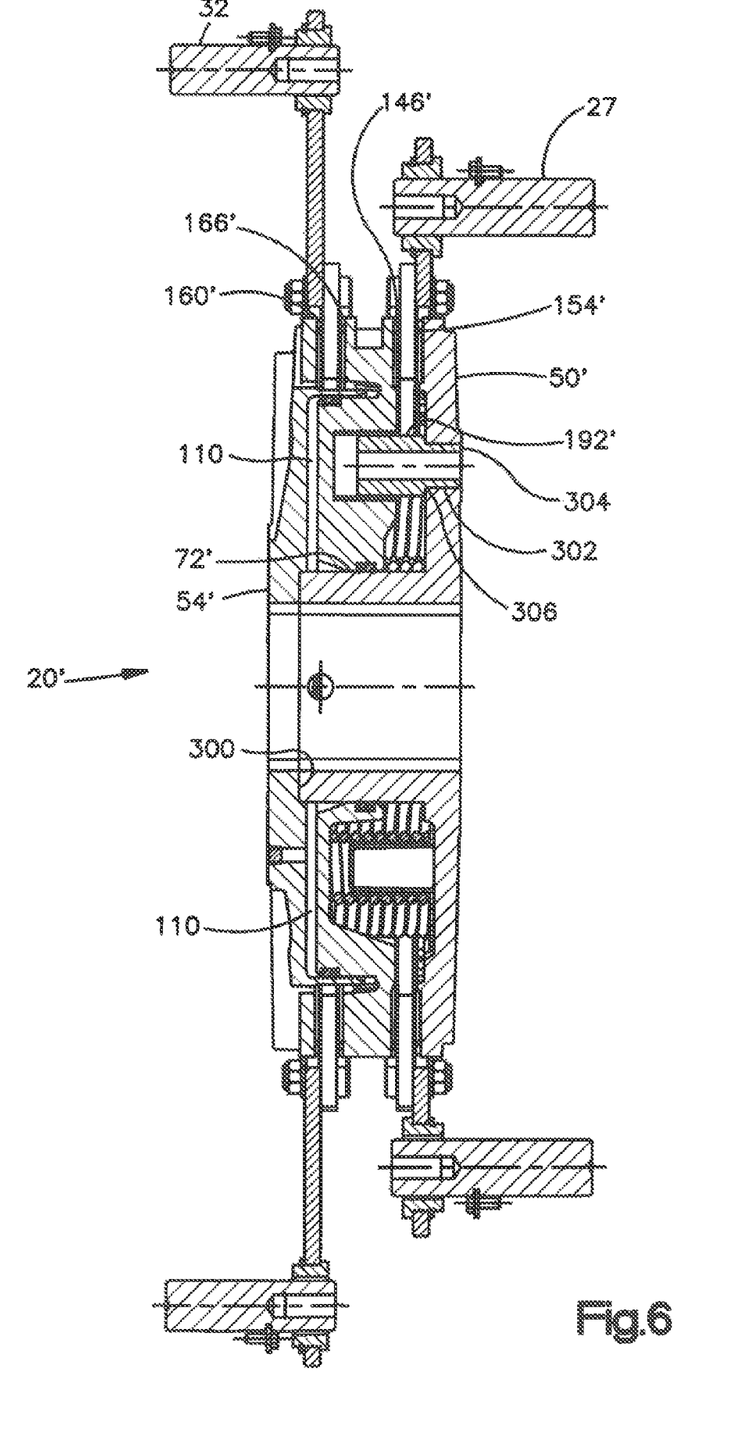
FIG. 6 is a sectional view of an alternate embodiment with a faster response time and stopping angle.
Figure 7:
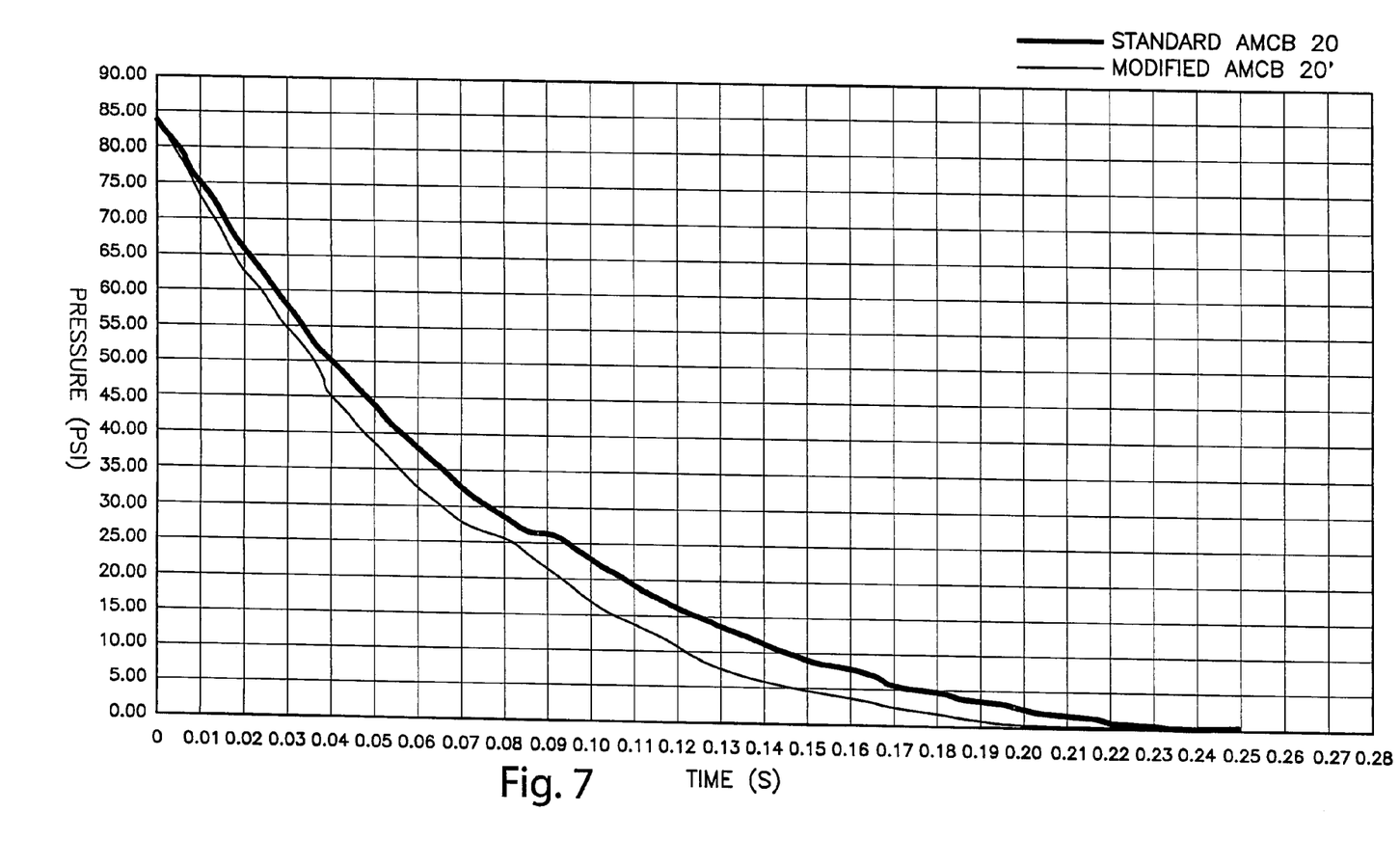
FIG. 7 is a graph of pressure in pounds per square inch (PSI) versus time in seconds (s) illustrating a comparison between a standard volume clutch-brake assembly and a reduced volume clutch-brake assembly.

Referring now to FIG. 6, where like numerals in this figure designate like or similar features to the previous embodiment shown and described in FIGS. 1-5, there is shown an improved alternate embodiment generally designated 20' having a faster response time and an improved stopping angle. The stopping angle as that term is used herein is meant to refer to the number of degrees the driven shaft 24 rotates from the point the operator switches the clutch-brake assembly from the clutch mode (engaged condition) to the brake mode (disengaged condition) until the driven shaft 24 comes to a complete rest. Reducing the air volume of the clutch-brake assembly provides a profound effect on reducing response time and the stopping angle as can be seen in FIG. 7.

The clutch-brake assembly 20' is structurally similar, operates and functions previously as described with reference to the clutch-brake assembly 20, but with the modifications that are specifically identified and numbered as noted herein. Reducing the air volume in the annular variable volume fluid chamber 110 reduces the time it takes the clutch-brake assembly 20' to switch from having the clutch engaged to having the brake engaged. Air from the variable volume fluid chamber 110 is evacuated as quickly as possible. In one model of the standard clutch-brake assembly 20 shown and described in FIGS. 1-5 the volume of air in the annular variable fluid chamber 110 is approximately 141 cubic inches in the engaged condition. By reducing this volume approximately 37 percent to approximately 89 cubic inches for example in one model, the response time and stopping angle is greatly improved as evident from the graph shown in FIG. 7 depicting the test results for that same model with different sized fluid chambers 110.

In order to reduce the volume of the annular fluid chamber 110 the cylinder 54' in this embodiment includes a centrally located counter-bore 300 adapted to receive a shortened central section 72' of the hub or base member 50'. These two modifications to the clutch-brake assembly 20 reduce the gap between the friction material on friction surfaces 146, 154 for the clutch disc 62 and 160, 166 for the brake disc 60, and the annular flange portion 144 of the piston 108. This results in insetting the piston 108 deeper into the cylinder 54' and reduces the air volume of the annular fluid chamber 110. As a result, each of the friction materials on the friction surfaces 146', 154' on the clutch disc 62 and on the friction surfaces 160', 166' on the brake disc 60 are reduced in thickness to allow them to fit in the reduced gap created by the aforementioned modifications.

Another structural change to the clutch-brake assembly 20' relates to the force transmitting members 192', 194', and 196'. An end portion 302 of each of the force transmitting members 192', 194', and 196' has a diameter that is smaller in size, approximately a 27% reduction in the diameter, than the main portion and is constructed to be received within an opening 304 in the hub 50'. This change in diameter creates a shoulder 306 in the force transmitting member that abuts and is supported by the hub 50' and functions to provide a resistance to moment load which results when the force transmitting members apply torque to the piston 108.

The friction material 400 employed in the clutch-brake assembly 20' has radially extending grooves 402 that not only serve as a visual indicator for the operator when replacement is required, but also function as performance enhancers by removing dust and other particulates. In addition to this safety mechanism, the clutch-brake assembly 20, 20' provides sufficient gap and piston travel distance in the disengaged condition or brake mode to stop a press or machine with metal to metal contact unlike the clutch-brake assemblies sold by others in this industry. These two safety measures are important features of the present invention.

Figure 8:
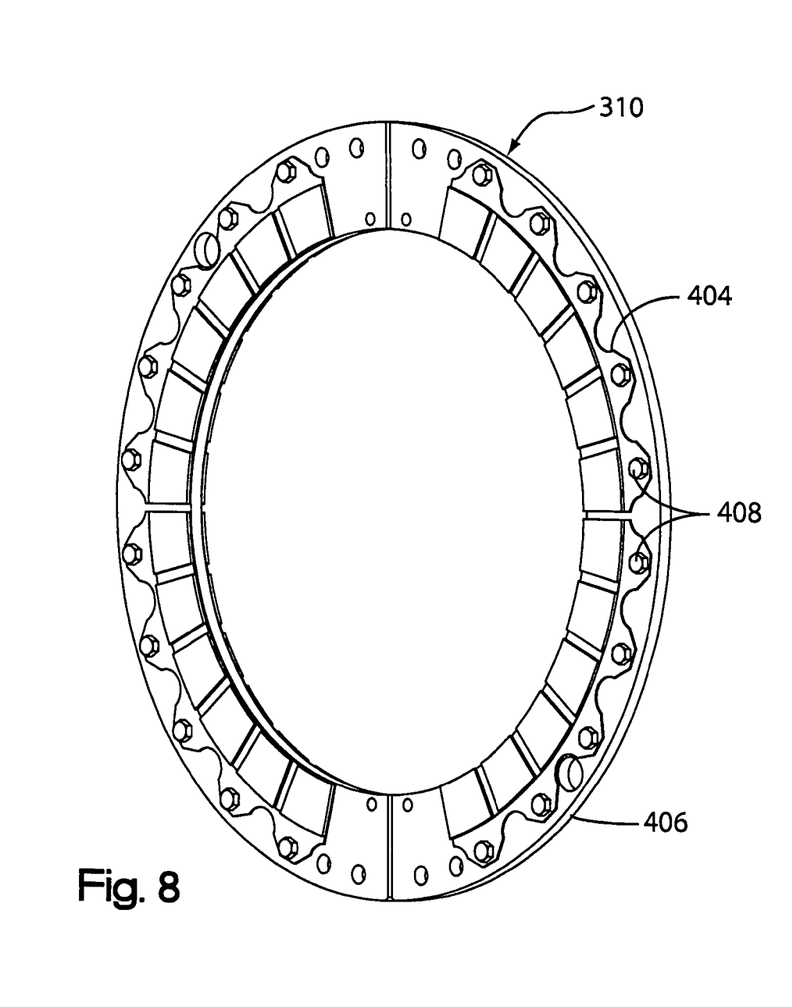
FIG. 8 is an elevated perspective view of a disc suitable for either the clutch disc or brake disc according to an embodiment of the present invention.

Referring now to FIG. 8, there is depicted a friction disc 310 suitable for use as the brake disc 60 or clutch disc 62. The friction material 400 is bonded to a scalloped backing plate 404 which is attached to the core plate 406 with a plurality of fasteners 408. Scalloped backing plate 404 includes a plurality of openings (not shown) that mechanically engage the friction material 400. These openings are generally circular in construction and are staggered in an arrangement that provides five openings for every six friction material segments 410. The openings are approximately 10 millimeters in diameter in one embodiment.

Figure 9:
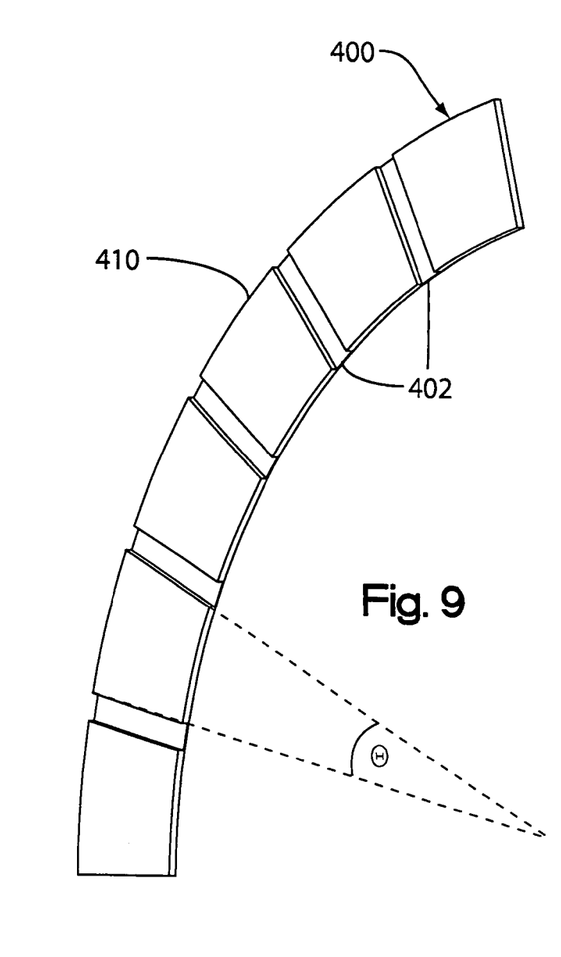
FIG. 9 is a perspective view of a segment of the friction material.

The friction material 400 in the embodiment seen in FIG. 9 is comprised of four groups of six segments 410 on each side of the core plate 406. Each of the segments 410 are separated with grooves 402 that are disposed at an approximate angle θ of 12.5 degrees plus or minus 0.5 degrees. The grooves have an approximate width of 10 millimeters plus or minus approximately 0.8 millimeter and a depth of approximately 2.75 millimeters plus or minus 0.25 millimeters.

Advantageously the clutch-brake assembly 20' employs the aforementioned thin friction material 400 that is maintained in a flat condition on the scalloped backing plate 404. For the purpose of this disclosure, a thin friction material is intended to mean one that ranges from 0.50 millimeters upto approximately 4.0 millimeters, and more preferably is approximately 3.25 millimeters plus or minus 0.25 millimeters. Further, the grooves 402 facilitate maintaining the friction material 400 in a flat condition on the backing plate by minimizing the residual and internal stress, and strain during the molding and curing of the friction material 400 integrally on the scalloped backing plate 404 with the overall net effect of reducing warping of the friction material 400.

Conclusion

In view of the foregoing description, it is clear that the present invention provides a new and improved clutch-brake assembly 20, 20' for transmitting force to rotate a shaft 24 and for transmitting force to retain the shaft against rotation. The clutch-brake assembly 20, 20' is readily adjusted to accommodate different force and torque requirements. The clutch-brake assembly 20, 20' may include a base member 50, 50' having a central opening 78 which receives a shaft 24. A clutch surface 146, 146', 154, 154' may be movable relative to the base member 50, 50'. A brake surface 160, 160', 166, 166' may be movable relative to the base member 50, 50'. A piston 108 may be movable in a first direction relative to the base member to press a first friction surface 144 against the clutch surface 146, 146' to enable force to be transmitted from the clutch surface. The piston 108 may be movable in a second direction to press the second friction surface 164 against the brake surface 166, 166'.

A plurality 134 of springs 138 may urge the piston 108 in one of the first or second directions relative to the base member 50, 50'. A plurality 180 of spaced apart spring retainers 182-186 have projecting portions 224 on which the springs 138 are telescopically disposed. Force transmitting members 192-196 or 192'-196' are disposed between adjacent spring retainers 182-186 of the plurality 180 of spring retainers.

Having described the invention, the following is claimed:

1. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connected with a source of driving force to be transmitted to the shaft, a brake surface which is disposed adjacent to said base member and is movable relative to said base member, said brake surface being connected with a stationary member, a piston which is connected with said base member and is movable in first and second directions relative to said base member, said piston being movable in one of the first and second directions under the influence of fluid pressure applied to said piston from a variable volume annular fluid chamber to press a first friction surface against said clutch surface to transmit force between said clutch surface and said base member, said piston being movable in another of the first and second directions to press a second friction surface against said brake surface to transmit force between said brake surface and said base member, a plurality of force transmitting members which extend between said piston and said base member and transmit force between said piston and said base member, a plurality of springs which urge said piston to move in the other of said first and second directions relative to said base member, and a plurality of spaced apart spring retainers disposed between said base member and said piston, each of said spring retainers having a base portion and a plurality of projecting portions extending from said base portion, each of said springs being telescopically disposed on one of said projecting portions of said spring retainers to locate said springs relative to said base member, each of said force transmitting members being disposed between adjacent spring retainers of said plurality of spring retainers, said plurality of projecting portions extending from said base portion of each of said spring retainers includes a first series of projections which are disposed in an arcuate inner array having a first radius of curvature and a second series of projections which are disposed in an arcuate outer array having a second radius of curvature which is larger than said first radius of curvature, said plurality of force transmitting members are disposed in an arcuate array having a radius of curvature which is larger than said first radius of curvature, each of said plurality of force transmitting members has a diameter that decreases in size with one end received within said base member, each of said force transmitting members having a shoulder that abuts and is supported by the base member for providing a resistance to moment load.

2. An apparatus as set forth in claim 1 wherein said projections and said base portion of each of said spring retainers are integrally formed as one piece and said projections are hollow.

3. An apparatus as set forth in claim 1 further including a cover member which is fixedly connected with said base member, said piston being disposed between said base and cover members, said cover member having a plurality of air flow passages which are connected in fluid communication with air flow passages in said piston.

4. An apparatus as set forth in claim 3 wherein said air flow passages extend axially through said cover member and extend radially through a portion of said piston.

5. An apparatus as set forth in claim 1 further including a plurality of spaced apart recesses formed in said base member, said base portion of each of said spring retainers being disposed in one of said recesses of said plurality of recesses, a plurality of ribs formed in said base member, each of said ribs is disposed between adjacent recesses of said plurality of recesses.

6. An apparatus as set forth in claim 1 further including a cover member having a fairly centrally located counter-bore constructed to receive one end of an axially extending central section of said base member.

7. An apparatus as set forth in claim 1, wherein said variable volume fluid chamber is constructed to reduce air volume for a more rapid evacuation of the air to cause the brake surface to engage faster.

8. An apparatus as set forth in claim 1, wherein said brake surface and said clutch surface include friction material having a plurality of segments separated by a plurality of radially extending grooves, said grooves being situated at an angular orientation and a selected depth for removing dust and particulates.

9. A friction material as set forth in claim 8, wherein said angular orientation ranges from approximately 12.0 degrees to approximately 13.0 degrees.

10. A friction material as set forth in claim 8, wherein the friction material has a thickness ranging from approximately 0.50 millimeters to approximately 6.50 millimeters.

11. A friction material as set forth in claim 10, wherein the friction material has a thickness of approximately 3.25 millimeters.

\* \* \* \* \*